(12) United States Patent
Kwon et al.

(10) Patent No.: US 10,403,863 B2
(45) Date of Patent: Sep. 3, 2019

(54) PACKAGING FOR CABLE-TYPE SECONDARY BATTERY AND CABLE-TYPE SECONDARY BATTERY COMPRISING THE SAME

(71) Applicant: LG Chem, Ltd., Seoul (KR)

(72) Inventors: Yo-Han Kwon, Daejeon (KR);
Je-Young Kim, Daejeon (KR);
Sang-Hun Kim, Daejeon (KR);
Sang-Wook Woo, Daejeon (KR)

(73) Assignee: LG Chem, Ltd. (KR)

( * ) Notice: Subject to any disclaimer, the term of this patent is extended or adjusted under 35 U.S.C. 154(b) by 35 days.

(21) Appl. No.: 14/191,608

(22) Filed: Feb. 27, 2014

(65) Prior Publication Data

US 2014/0178745 A1    Jun. 26, 2014

Related U.S. Application Data

(63) Continuation of application No. PCT/KR2013/007840, filed on Aug. 30, 2013.

(30) Foreign Application Priority Data

Aug. 30, 2012 (KR) .................. 10-2012-0095656

(51) Int. Cl.
*H01M 2/02* (2006.01)
*H01M 4/66* (2006.01)
(Continued)

(52) U.S. Cl.
CPC ......... *H01M 2/0257* (2013.01); *H01M 2/026* (2013.01); *H01M 2/0267* (2013.01);
(Continued)

(58) Field of Classification Search
CPC ........ H01M 10/0422; H01M 10/0436; H01M 10/052; H01M 2/0257; H01M 2/026;
(Continued)

(56) References Cited

U.S. PATENT DOCUMENTS

2002/0164525 A1    11/2002  Hosokawa et al.
2006/0093922 A1*    5/2006  Kim ................ H01M 2/0275
                                                            429/251
(Continued)

FOREIGN PATENT DOCUMENTS

CN            1262790 A      8/2000
CN          101563221 A     10/2009
(Continued)

OTHER PUBLICATIONS

Search Report from European Application No. 13833323.2, dated Mar. 18, 2016.

*Primary Examiner* — Yan Lan
(74) *Attorney, Agent, or Firm* — Lerner, David, Littenberg, Krumholz & Mentlik, LLP

(57) ABSTRACT

The present invention relates to a packaging for a cable-type secondary battery extending longitudinally, comprising: a hollow metal foil layer; a first polymer resin layer formed on one surface of the metal foil layer; and a second polymer resin layer formed on the other surface of the metal foil layer, and a cable-type secondary battery comprising the packaging.
The packaging of the present invention comprises a metal foil layer to prevent the contamination of an electrolyte in the cable-type battery and prevent the deterioration of battery performances, and also maintain the mechanical strength of the cable-type battery.

22 Claims, 2 Drawing Sheets

(51) Int. Cl.
   *H01M 4/75*      (2006.01)
   *H01M 10/04*     (2006.01)
   *H01M 10/052*    (2010.01)

(52) U.S. Cl.
   CPC ....... *H01M 2/0277* (2013.01); *H01M 2/0285* (2013.01); *H01M 2/0287* (2013.01); *H01M 4/661* (2013.01); *H01M 4/75* (2013.01); *H01M 10/0422* (2013.01); *H01M 10/0436* (2013.01); *H01M 10/052* (2013.01)

(58) Field of Classification Search
   CPC ............. H01M 2/0267; H01M 2/0277; H01M 2/0285; H01M 2/0287; H01M 4/661; H01M 4/75; B29C 35/065; B29C 39/203; B29C 47/0023; B29C 47/0026; Y02P 70/54; Y02E 60/122
   USPC .......... 428/36.9, 36.91, 36.92, 3.57; 429/163
   See application file for complete search history.

(56) References Cited

U.S. PATENT DOCUMENTS

| | | | |
|---|---|---|---|
| 2008/0050651 A1* | 2/2008 | Wakai | B29C 61/003 429/185 |
| 2010/0316821 A1* | 12/2010 | Chang | B29C 47/065 428/35.8 |
| 2011/0003209 A1* | 1/2011 | Katayama | H01M 2/1606 429/246 |
| 2011/0287320 A1 | 11/2011 | Takasaki et al. | |
| 2012/0107657 A1 | 5/2012 | Kwon et al. | |
| 2012/0156554 A1 | 6/2012 | Kwon et al. | |
| 2012/0244421 A1 | 9/2012 | Yamazaki et al. | |
| 2013/0189570 A1 | 7/2013 | Park et al. | |
| 2013/0344368 A1 | 12/2013 | Kwon et al. | |

FOREIGN PATENT DOCUMENTS

| | | |
|---|---|---|
| CN | 102431239 A | 5/2012 |
| JP | 07-105748 A | 4/1995 |
| JP | 2000-285900 A | 10/2000 |
| JP | 2001110445 A | 4/2001 |
| JP | 2001-176464 A | 6/2001 |
| JP | 2005-116270 A | 4/2005 |
| KR | 20080005627 A | 1/2008 |
| KR | 2012-0021194 A | 3/2012 |
| KR | 10-2012-0047555 A | 5/2012 |
| KR | 2012-0094871 A | 8/2012 |
| WO | 2008078948 A1 | 7/2008 |
| WO | 2010-058574 A1 | 5/2010 |

* cited by examiner

PACKAGING FOR CABLE-TYPE SECONDARY BATTERY AND CABLE-TYPE SECONDARY BATTERY COMPRISING THE SAME

CROSS-REFERENCE TO RELATED APPLICATION

This application is a continuation of International Application No. PCT/KR2013/007840 filed on Aug. 30, 2013, which claims priority under 35 USC 119(a) to Korean Patent Application No. 10-2012-0095656 filed in the Republic of Korea on Aug. 30, 2012, the disclosures thereof are incorporated herein by reference.

TECHNICAL FIELD

The present invention relates to a packaging for a cable-type secondary battery and a cable-type secondary battery comprising the packaging, and more particularly to a packaging for a cable-type secondary battery, which can inhibit the contamination of an electrolyte solution present within the battery to prevent the deterioration of battery performances, and a cable-type secondary battery comprising the packaging.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NIMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape.

This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. However, there have been no disclosures specifically providing a packaging for protecting such a cable-type battery. Particularly, if tube packaging made of general polymeric materials is used, moisture or air may permeate the micropores of the polymer to contaminate an electrolyte in batteries and deteriorate the performances of batteries.

DISCLOSURE

Technical Problem

The present invention is designed to solve the above-mentioned problems, and therefore it is an object of the present invention to provide a packaging for a cable-type battery, which can prevent the contamination of an electrolyte in the cable-type battery and prevent the deterioration of battery performances.

Technical Solution

In order to achieve the objects, in accordance with one aspect of the present invention, there is provided a packaging for a cable-type secondary battery extending longitudinally, comprising: a hollow metal foil layer; a first polymer resin layer formed on one surface of the metal foil layer; and a second polymer resin layer formed on the other surface of the metal foil layer.

In the present invention, the metal foil layer may comprise any one selected from the group consisting of iron (Fe), carbon (C), chrome (Cr), manganese (Mn), nickel (Ni), copper (Cu), aluminum (Al), an equivalent thereof and an alloy of two or more thereof.

The first polymer resin layer may comprise any one selected from the group consisting of polyolefin resins, polyester resins, polyamide resins, fluoro-containing resins and a mixture thereof.

The second polymer resin layer may comprise any one selected from the group consisting of polyolefin resins, polyester resins, fluoro-containing resins and a mixture thereof.

In the present invention, the polyolefin resins may be any one selected from the group consisting of a copolymer of polypropylene-acrylic acid, a copolymer of polyethylene-acrylic acid, polypropylene chloride, a terpolymer of polypropylene-butylene-ethylene, polyethylene, a copolymer of ethylene-propylene, and a mixture thereof.

Also, the first polymer resin layer or the second polymer resin layer may further comprise hydrophobic inorganic particles.

The hydrophobic inorganic particles may be obtained from any one selected from the group consisting of $SiO_1$, $Al_2O_3$, $MgO$, $BaTiO_3$, $ZrO_2$, $ZnO$ and a mixture thereof.

The hydrophobic inorganic particles may have an average particle diameter of 1 nm to 5 μm.

Meanwhile, a layer of hydrophobic inorganic particles may be further formed between the metal foil layer and the first polymer resin layer, or between the metal foil layer and the second polymer resin layer, or on the other surface of the second polymer resin layer whose one surface is faced to the metal foil layer.

The layer of hydrophobic inorganic particles may comprise any one selected from the group consisting of $SiO_2$, $Al_2O_3$, $MgO$, $BaTiO_3$, $ZrO_2$, $ZnO$ and a mixture thereof.

In accordance with another aspect of the present invention, there is provided a cable-type secondary battery, comprising: an electrode assembly having a horizontal cross section of a predetermined shape and extending longitudinally, which comprises an inner current collector, an inner electrode active material layer, an outer electrode active material layer, an electrolyte layer interposed between the inner electrode active material layer and the outer electrode active material layer, and an outer current collector foil formed on the outer surface of the outer electrode active material layer; and a packaging configured to surround the electrode assembly, wherein the packaging comprises a hollow metal foil layer; a first polymer resin layer formed on one surface of the metal foil layer; and a second polymer resin layer formed on the other surface of the metal foil layer.

In the present invention, the outer current collector foil may be in the form of a half-pipe or a mesh.

Also, the outer current collector foil may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

In accordance with yet another aspect of the present invention, there is provided a cable-type secondary battery, comprising: an electrode assembly having a horizontal cross section of a predetermined shape and extending longitudinally, which comprises an inner current collector, an inner electrode active material layer, an outer electrode active material layer, and an electrolyte layer interposed between the inner electrode active material layer and the outer electrode active material layer; and a packaging configured to surround the electrode assembly, wherein the packaging comprises a hollow metal foil layer acting as an outer current collector; a first polymer resin layer formed on one surface of the metal foil layer; and a second polymer resin layer formed at both ends of the other surface of the metal foil layer.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

In the present invention, an inner electrode and an outer electrode may be an anode and a cathode, respectively, and also they may be reversed.

Therefore, one of the inner electrode active material layer and the outer electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; an alloy of the metals; an oxide (MeOx) of the metals; a complex of the metals and carbon; and a mixture thereof.

Meanwhile, one of the inner electrode active material layer and the outer electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Also, the electrolyte layer may comprise an electrolyte selected from a gel polymer electrolyte using PEO, PVdF, PMMA, PAN, or PVAc; and a solid electrolyte of PEO, polypropylene oxide (PPO), polyether imine (PEI), polyethylene sulphide (PES), or polyvinyl acetate (PVAc).

Advantageous Effects

The packaging of the present invention comprises a metal foil layer to prevent the contamination of an electrolyte in the cable-type battery and prevent the deterioration of battery performances, and also maintain the mechanical strength of the cable-type battery.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Figure 1:
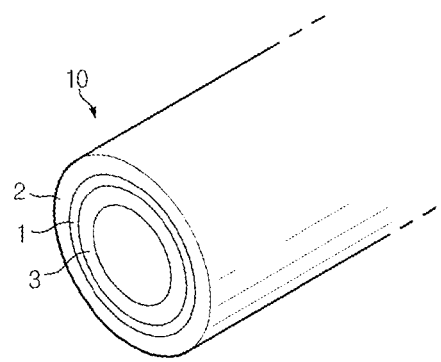
FIG. 1 is a perspective view of a packaging for a cable-type secondary battery according to one embodiment of the present invention.

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Also, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

Figure 2:
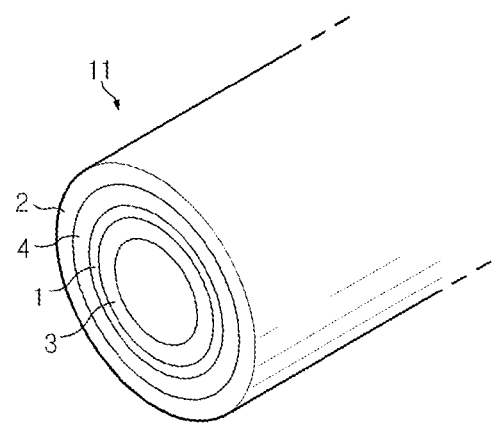
FIG. 2 is a perspective view of a packaging for a cable-type secondary battery according to another embodiment of the present invention.
Figure 3:
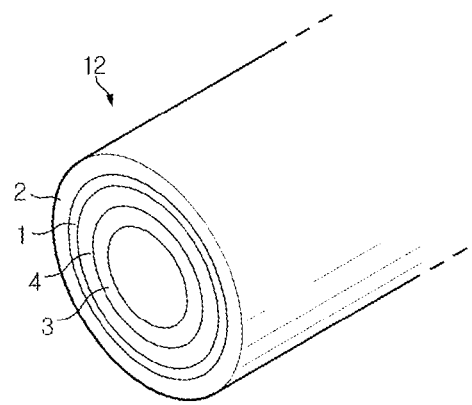
FIG. 3 is a perspective view of a packaging for a cable-type secondary battery according to yet another embodiment of the present invention.
Figure 4:
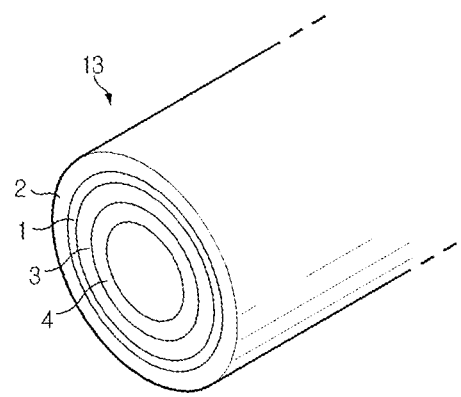
FIG. 4 is a perspective view of a packaging for a cable-type secondary battery according to still yet another embodiment of the present invention.

FIG. 1 is a perspective view of a packaging for a cable-type secondary battery according to one embodiment of the present invention, and FIGS. 2 to 4 are each perspective views of packagings for a cable-type secondary battery according to other embodiments of the present invention.

Referring to FIG. 1, a packaging 10 for a cable-type secondary battery according to one aspect of the present invention has a structure of extending longitudinally, and comprises a hollow metal foil layer 1; a first polymer resin layer 2 formed on one surface of the metal foil layer 1; and a second polymer resin layer 3 formed on the other surface of the metal foil layer 1.

A general tube packaging made of a polymer material may cause the permeation of moisture or air into the polymer material to contaminate an electrolyte in batteries and deteriorate battery performances, whereas the packaging 10 for a cable-type secondary battery comprises the metal foil layer 1 to block the permeation of moisture or air into the polymer material, thereby preventing the contamination of an electrolyte in the cable-type battery and the deterioration of battery performances, and maintaining the mechanical strength of the cable-type battery.

In the present invention, the metal foil layer 1, which functions to block the permeation of moisture or air from the outside into the inside, may comprise any one selected from the group consisting of iron (Fe), carbon (C), chrome (Cr), manganese (Mn), nickel (Ni), copper (Cu), aluminum (Al), an equivalent thereof and an alloy of two or more thereof, but the present invention is not limited thereto. Among these, iron can be used in the formation of the metal foil layer 1 to enhance mechanical strength, and aluminum can be used to provide good flexibility. Preferably, an aluminum foil may be used.

The first polymer resin layer 2 may comprise any one selected from the group consisting of polyolefin resins, polyester resins, polyamide resins, fluoro-containing resins and a mixture thereof.

If the first polymer resin layer 2 becomes the outermost layer, it is preferred that it is made of nylon or polyethylene terephthalate, but the present invention is not limited thereto.

Also, the first polymer resin layer 2 may act as the layer of a heat-shrinkable tube. The heat-shrinkable tube refers to a tube which is shrunk when heated to closely encase a terminal or a substance having a different shape or size. Such a heat-shrinkable tube is mostly made of a polymer resin and used for insulating or other purposes. In the present invention, commercially available heat-shrinkable tubes made of various materials and having various forms may be properly used according to the desired purpose. Generally, since the heat-shrinkable tube is inserted in lithium ion batteries by using an automatic coating machine before heat shrinkage, it is necessary for the heat shrinkable tube to have hardness such that its opening can be opened and supported by itself. Also, a shrinkage process is preferably carried out at a low temperature, for example, at a temperature of 70 to 200° C., preferably 70 to 120° C., so as to avoid the thermal damage of the lithium ion batteries. The heat-shrinkable tube may be made of polyolefins such as polyethylene and polypropylene, polyesters such as polyethylene terephthalate, and fluoro-containing resins such as polyvinylidene fluoride and polytetrafluoroethylene.

The second polymer resin layer 3 may comprise any one selected from the group consisting of polyolefin resins, polyester resins, fluoro-containing resins and a mixture thereof.

The second polymer resin layer 3 may act as the layer of a heat-shrinkable tube, similar to the first polymer resin layer 2, and examples thereof are the same as mentioned above.

Also, the second polymer resin layer 3 may act as an internal insulating layer, and in this case, the second polymer resin layer 3 may comprise any one selected from the group consisting of a copolymer of polypropylene-acrylic acid, a copolymer of polyethylene-acrylic acid, polypropylene chloride, a terpolymer of polypropylene-butylene-ethylene, polyethylene, a copolymer of ethylene-propylene, and a mixture thereof, but the present invention is not limited thereto.

Meanwhile, the first polymer resin layer 2 or the second polymer resin layer 3 may further comprise hydrophobic inorganic particles.

The hydrophobic inorganic particles may be obtained from any one selected from the group consisting of $SiO_2$, $Al_2O_3$, MgO, $BaTiO_3$, $ZrO_2$, ZnO and a mixture thereof, but are not limited thereto.

Also, the hydrophobic inorganic particles may have an average particle diameter of 1 nm to 5 μm. The additional use of the hydrophobic inorganic particles can more enhance the insulation effect within batteries and can block the permeation of moisture into batteries to minimize the contamination of electrolyte components in the batteries, thereby preventing the deterioration of battery performances.

Referring to FIGS. 2 to 4, packagings 11, 12, 13 for a cable-type secondary battery according to other aspects of the present invention may each comprise a layer 4 of hydrophobic inorganic particles between the metal foil layer 1 and the first polymer resin layer 2, or between the metal foil layer 1 and the second polymer resin layer 3, or on the other surface of the second polymer resin layer 3 whose one surface is faced to the metal foil layer 1.

The layer 4 of hydrophobic inorganic particles may further comprise a polymer selected from the group consisting of a copolymer of polypropylene-acrylic acid, a copolymer of polyethylene-acrylic acid, polypropylene chloride, a terpolymer of polypropylene-butylene-ethylene, polyethylene, a copolymer of ethylene-propylene, and a mixture thereof, in addition to hydrophobic inorganic particles. Examples of usable hydrophobic inorganic particles are the same as mentioned above. The additional use of the hydrophobic inorganic particles can more enhance the insulation effect within batteries and can block the permeation of moisture into batteries to minimize the contamination of electrolyte components in the batteries, thereby preventing the deterioration of battery performances.

Figure 5:
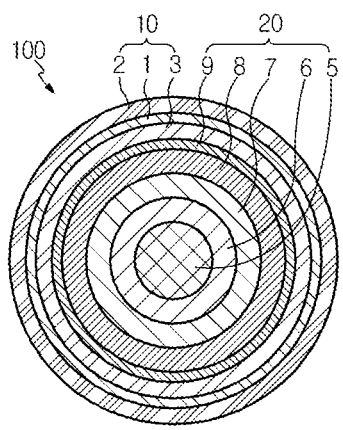
FIG. 5 shows a cross-section of a cable-type secondary battery according to one embodiment of the present invention.
Figure 6:
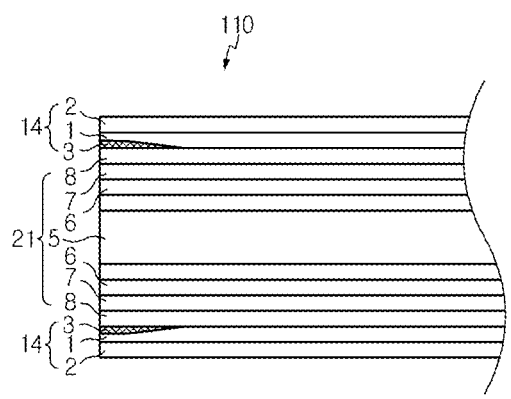
FIG. 6 shows a longitudinal section of a cable-type secondary battery according to another embodiment of the present invention.

Meanwhile, FIG. 5 shows a cross-section of a cable-type secondary battery according to one embodiment of the present invention, and FIG. 6 shows a longitudinal section of a cable-type secondary battery according to another embodiment of the present invention.

Referring to FIG. 5, a cable-type secondary battery 100 according to one aspect of the present invention comprises an electrode assembly 20 having a horizontal cross section of a predetermined shape and extending longitudinally, which comprises an inner current collector 5, an inner electrode active material layer 6, an outer electrode active material layer 8, an electrolyte layer 7 interposed between the inner electrode active material layer 6 and the outer electrode active material layer 8, and an outer current collector foil 9 formed on the outer surface of the outer electrode active material layer 8; and a packaging 10 configured to closely surround the electrode assembly 20, wherein the packaging 10 comprises a hollow metal foil layer 1; a first polymer resin layer 2 formed on one surface of the metal foil layer 1; and a second polymer resin layer 3 formed on the other surface of the metal foil layer 1. The term 'a predetermined shape' used herein refers to not being particularly limited to any shape, and means that any shape that does not damage the nature of the present invention is possible. The cable-type secondary battery 100 of the present invention has a horizontal cross section of a predetermined shape, a linear structure, which extends in the longitudinal direction, and flexibility, so it can freely change in shape.

In the present invention, the outer current collector foil 9 may be in the form of a half-pipe or a mesh, or may consist of a coating layer of a metal paste.

If the current collector is a half-pipe form, two or three current collectors are used to adhere to the packaging, so that the outer surface of the electrode assembly is completely surrounded by them. In this case, considering the heat-shrinkage of the polymer resins which may acts as a tube, the current collectors are preferably disposed to maintain regular intervals.

If the current collector is a mesh form, a certain degree of stretching property can be obtained. Therefore, such a form of the current collector may be cut and used to completely surround the outer surface of the electrode assembly.

Also, if the current collector is made of a metal paste, the metal paste is coated on the inner surface of the packaging to form the current collector.

The outer current collector foil 9 may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. Examples of the conductive material may include polyacetylene, polyaniline, polypyrrole, polythiophene, polysulfurnitride, indium tin oxide (ITO), copper, silver, palladium and nickel. Example of the conductive polymer may include polyacetylene, polyaniline, polypyrrole, polythiophene and polysulfurnitride.

In addition, referring to FIG. 6, a cable-type secondary battery 110 according to another aspect of the present invention comprises an electrode assembly 21 having a horizontal cross section of a predetermined shape and extending longitudinally, which comprises an inner current collector 5, an inner electrode active material layer 6, an outer electrode active material layer 8, and an electrolyte layer 7 interposed between the inner electrode active material layer 6 and the outer electrode active material layer 8; and a packaging 14 configured to closely surround the electrode assembly 21, wherein the packaging 14 comprises a hollow metal foil layer 1 acting as an outer current collector; a first polymer resin layer 2 formed on one surface of the metal foil layer 1; and a second polymer resin layer 3 formed at both ends of the other surface of the metal foil layer 1.

In such a cable-type secondary battery, the metal foil layer 1 blocks the permeation of moisture or air into batteries and maintains the mechanical strength of the packaging, and also acts as an outer current electrode. Accordingly, it needs no additional outer current electrode, and thus is advantageous in terms of economic effects.

Also, since the second polymer resin layer may act as a heat-shrinkable tube layer or an inner insulation layer at both ends of the cable-type secondary battery, the sealability or insulating property of the cable-type secondary battery can be enhanced.

The inner current collector 5 may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer, but is not limited thereto. Examples of the conductive material may include polyacetylene, polyaniline, polypyrrole, polythiophene, polysulfurnitride, indium tin oxide (ITO), copper, silver, palladium and nickel. Example of the conductive polymer may include polyacetylene, polyaniline, polypyrrole, polythiophene and polysulfurnitride. But the present invention is not limited thereto.

In the present invention, an inner electrode and an outer electrode may be an anode and a cathode, respectively, and also they may be reversed.

Therefore, when the inner electrode or the outer electrode acts as an anode, the active material layer thereof may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; an alloy of the metals; an oxide (MeOx) of the metals; a complex of the metals and carbon; and a mixture thereof.

Meanwhile, when the inner electrode or the outer electrode acts as a cathode, the active material layer thereof may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Also, the electrolyte layer 7 may comprise an electrolyte selected from a gel polymer electrolyte using PEO, PVdF, PMMA, PAN, or PVAc; and a solid electrolyte of PEO, polypropylene oxide (PPO), polyether imine (PEI), polyethylene sulphide (PES), or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

In addition, the electrolyte layer 7 may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Meanwhile, the configurations illustrated in the drawings and the embodiments herein are just preferable examples for the purpose of better understanding of the present invention, not intended to limit the scope of the disclosure. Accordingly, it is apparent to a person having ordinary skill in the art that other equivalents and modifications could be made thereto without departing from the spirit and scope of the disclosure.

What is claimed is:

1. A packaging for a cable-type secondary battery extending longitudinally, comprising:
   a cylindrical metal foil member having a lumen;
   a first insulating polymer resin layer formed on an outer surface of the metal foil member; and
   a second insulating polymer resin layer formed on an inner surface of the metal foil member;
   wherein the first insulating polymer resin layer and the second insulating polymer resin layer are heat-shrinkage tubes,
   wherein the first insulating polymer resin layer further comprises hydrophobic inorganic particles, and wherein the second insulating polymer resin layer formed on the inner surface of the metal foil member is formed only at ends of the metal foil member.

2. The packaging according to claim 1, wherein the metal foil member comprises any one selected from the group consisting of iron (Fe), carbon (C), chrome (Cr), manganese (Mn), nickel (Ni), copper (Cu), aluminum (Al), an equivalent thereof and an alloy of two or more thereof.

3. The packaging according to claim 1, wherein the first polymer resin layer comprises any one selected from the group consisting of polyolefin resins, polyester resins, polyamide resins, fluoro-containing resins and a mixture thereof.

4. The packaging according to claim 1, wherein the second polymer resin layer comprises any one selected from the group consisting of polyolefin resins, polyester resins, fluoro-containing resins and a mixture thereof.

5. The packaging according to claim 4, wherein the polyolefin resins is selected from the group consisting of a copolymer of polypropylene-acrylic acid, a copolymer of polyethylene-acrylic acid, polypropylene chloride, a terpolymer of polypropylene-butylene-ethylene, polyethylene, a copolymer of ethylene-propylene, and a mixture thereof.

6. The packaging according to claim 1, wherein the hydrophobic inorganic particles are obtained from any one selected from the group consisting of $SiO_2$, $Al_2O_3$, MgO, $BaTiO_3$, $ZrO_2$, ZnO and a mixture thereof.

7. The packaging according to claim 1, wherein the hydrophobic inorganic particles have an average particle diameter of 1 nm to 5 μm.

8. A cable-type secondary battery, comprising:
an electrode assembly having a horizontal cross section of a predetermined shape and extending longitudinally, which comprises an inner current collector, an inner electrode active material layer, an outer electrode active material layer, an electrolyte layer interposed between the inner electrode active material layer and the outer electrode active material layer, and an outer current collector foil formed on an outer surface of the outer electrode active material layer; and
the packaging of claim 1 surrounding the electrode assembly.

9. The cable-type secondary battery according to claim 8, wherein the outer current collector foil is in the form of a half-pipe or a mesh.

10. The cable-type secondary battery according to claim 8, wherein the outer current collector foil is made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

11. The packaging according to claim 1, wherein the second insulating polymer resin layer further comprises hydrophobic inorganic particles.

12. A cable-type secondary battery, comprising:
an electrode assembly having a horizontal cross section of a predetermined shape and extending longitudinally, which comprises an inner current collector, an inner electrode active material layer, an outer electrode active material layer, and an electrolyte layer interposed between the inner electrode active material layer and the outer electrode active material layer; and the packaging of claim 1 formed on an outer surface of the outer electrode active material layer.

13. A packaging for a cable-type secondary battery extending longitudinally, comprising:
a cylindrical metal foil member having a lumen;
a first insulating polymer resin layer formed on an outer surface of the metal foil member;
a second insulating polymer resin layer formed on an inner surface of the metal foil member; and
a layer of hydrophobic inorganic particles,
wherein the first insulating polymer resin layer and the second insulating polymer resin layer are heat-shrinkage tubes,
wherein the layer of hydrophobic inorganic particles is between the metal foil layer and the first insulating polymer resin layer, and
wherein the second insulating polymer resin layer formed on the inner surface of the metal foil member is formed only at ends of the metal foil member.

14. The packaging according to claim 13, wherein the layer of hydrophobic inorganic particles comprises any one selected from the group consisting of $SiO_2$, $Al_2O_3$, MgO, $BaTiO_3$, $ZrO_2$, ZnO and a mixture thereof.

15. The packaging according to claim 14, wherein the hydrophobic inorganic particles have an average particle diameter of 1 nm to 5 μm.

16. The packaging according to claim 13, wherein a second layer of hydrophobic inorganic particles is between the metal foil member and the second polymer resin layer.

17. The packaging according to claim 13, wherein a second layer of hydrophobic inorganic particles is on an inner surface of the second polymer resin layer whose outer surface faces the metal foil member.

18. The packaging according to claim 13, wherein the metal foil member comprises any one selected from the group consisting of iron (Fe), carbon (C), chrome (Cr), manganese (Mn), nickel (Ni), copper (Cu), aluminum (Al), an equivalent thereof and an alloy of two or more thereof.

19. The packaging according to claim 13, wherein the first polymer resin layer comprises any one selected from the group consisting of polyolefin resins, polyester resins, polyamide resins, fluoro-containing resins and a mixture thereof.

20. The packaging according to claim 13, wherein the second polymer resin layer comprises any one selected from the group consisting of polyolefin resins, polyester resins, fluoro-containing resins and a mixture thereof.

21. The packaging according to claim 20, wherein the polyolefin resins is selected from the group consisting of a copolymer of polypropylene-acrylic acid, a copolymer of polyethylene-acrylic acid, polypropylene chloride, a terpolymer of polypropylene-butylene-ethylene, polyethylene, a copolymer of ethylene-propylene, and a mixture thereof.

22. A cable-type secondary battery, comprising:
an electrode assembly having a horizontal cross section of a predetermined shape and extending longitudinally, which comprises an inner current collector, an inner electrode active material layer, an outer electrode active material layer, and an electrolyte layer interposed between the inner electrode active material layer and the outer electrode active material layer; and
the packaging of claim 13 formed on an outer surface of the outer electrode active material layer.

* * * * *